(12) United States Patent
Chapman (10) Patent No.: US 10,796,208 B1
(45) Date of Patent: Oct. 6, 2020

(54) INLINE PRINTABLE DUPLEX COLOR FILTERS

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/544,844

(22) Filed: Aug. 19, 2019

(51) Int. Cl.
*G06K 15/02* (2006.01)

(52) U.S. Cl.
CPC ....... *G06K 15/023* (2013.01); *G06K 15/1842* (2013.01); *G06K 15/1889* (2013.01)

(58) Field of Classification Search
None
See application file for complete search history.

(56) References Cited

U.S. PATENT DOCUMENTS

| | | | | |
|---|---|---|---|---|
| 6,212,354 B1* | 4/2001 | Garzolini | ........... | G03G 15/0105 399/321 |
| 2007/0268505 A1* | 11/2007 | Smith | ..................... | G06T 11/60 358/1.13 |
| 2018/0268267 A1* | 9/2018 | Harayama | ............ | G06K 15/023 |
| 2018/0350127 A1* | 12/2018 | Davidson | ................ | G06T 13/80 |

* cited by examiner

*Primary Examiner* — Frantz Bataille
(74) *Attorney, Agent, or Firm* — Ortiz & Lopez, PLLC; Luis M. Ortiz; Kermit D. Lopez (57) ABSTRACT

Systems and methods are described for inline rendering of a color filter within a print job. A program associated with a printing system can select an overhead transparency media to serve as a color filter during inline print job finishing. A duplex path and finishing for the transparency media can be enabled on the printing system by the program. A first side of the overhead transparency media can be printed on with one or more colors by the printing system by the program. A transform can be used on a second side of the overhead transparency media to correct for front to back registration and includes one or more colors printed directly underneath colors printed on the first side by the program. The transparency medium including color filters can be inserted into pages of the print job, which can be rendered in the form of a bound book.

20 Claims, 8 Drawing Sheets

INLINE PRINTABLE DUPLEX COLOR FILTERS

TECHNICAL FIELD

Embodiments are generally related to the field of rendering documents using rendering devices, such as printers and photocopiers. Embodiments are further related to the field of rendering device media including paper, transparencies, ink and filters. Embodiments are also related to methods for printing color filters within pages of a print job while rendering without the need for subsequent page insertion. Embodiments are also related to inline printable duplex color filters.

BACKGROUND

Printing remains a critically important function in the modern workplace and home alike. Printers are commonly used for business applications and for simple home printing applications. Printing systems known in the document reproduction arts can apply a marking material, such as ink or toner, onto a substrate such as a sheet of paper, a page-sized transparency, a textile, metal, plastic and objects having a non-negligible depth such as a coffee cup, bottles, and the like.

When white light shines on a red object, all of the colors that form the white light are absorbed except red, which is reflected. This is why the object appears red. A filter is a transparent material that absorbs some colors and allows others to pass through. Light is the only source of color. Color pigments (paints, dyes, or inks) show color by absorbing certain parts of the light spectrum and reflecting the parts that remain. Color filters work the same way, absorbing certain wavelengths of color and transmitting the other wavelengths. For example, a high quality magenta filter will absorb 100% of green light while allowing other aspect of white light (i.e., the majority of red, blue) to pass.

A color filter typically consists of a transparent substrate coated by three types of color resist (RGB; red, green and blue) in a specific pattern. Since each spot of color resist (sub pixel) is very small, it can be difficult to color each dot one by one. Instead, the entire transparent substrate is typically colored and the extra ink is then washed away with a developing solution. This process of coloring and removing typically can be repeated many times to complete the RGB pattern on the target media.

Color filters are used in a wide variety of applications including photography and optics. Low cost color filters for use in less stringent applications are available from many sources and are made of materials such as cellophane, which comes in many colors. Materials like cellophane must be offline finished.

Overhead transparencies are standard transparent materials for printers and like cellophane are available at low cost. Technically referred to as transparency film, transparencies enable the creation of presentation visuals in seconds using a Laser Printer. Transparencies have been widely used by business and academia on an overhead projector for colorful presentations. Transparent film material is sometimes utilized in combination with other media, such as standard printing paper as part of a book or other bound work. The problem with mass production of combined media where colored transparencies will be used is that the transparent film must be separately printed and then incorporated into the bound work with pages of printed paper. Sometimes, it is desired that only a portion of a printed page bare the transparent film, in which case a portion of transparency film will be pasted onto a page of the bound work (e.g., a book), as shown in the photograph depicted in FIG. 5, labeled as Prior Art. Manual steps such as this are much more expensive as compared to inline finishing. This example illustrates a process that wasn't able to take advantage of the low cost finishing features inline that are commonly available on printers, such as stapling, binding, gluing, hole punching, etc.

Accordingly, what is needed are methods and system that enable inline duplex mix-media printing, where colored transparent media can be printed in duplex mode to increase a color filtering amount of a filter. It would be a benefit to provide the ability for colored printer users to include color filters in printed output without the labor and expense that can be experienced with additional finishing or special page inclusion/insertion.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide methods and systems that enable inline printable duplex color filters to color printer users.

It is another aspect of the disclosed embodiments to provide a method for printing color filters within a mixed media print job.

According to features of the embodiments, a method enables printing a desired filter color within a fixed area on a transparency sheet (e.g., similar to transparent sheets previously used for overhead projectors) and inserting the printed sheet within a mixed media print job.

It is a feature of the embodiments to provide a low quality color filter that can be incorporated into, for example, a book.

It is a feature of the embodiments to provide for a color filter that can be used for either instructional purposes or simple effects (e.g. viewing color blind targets), wherein the transparency can be printed in duplex mode to increase the color-filtering amount of the filter.

It is yet another feature of the embodiments to benefit users of colored printers by providing them with an ability to include color filters in printed output without additional finishing or special page inclusion.

In accordance with features of the embodiment, a method can include steps of providing a printing device modified by computer code to operate in duplex printing mode and engage in inline color transparency finishing; defining at least one of a correction matrix or affine transform in a processor associated with the printing device to account for front to back registration within a transparency medium rendering as part of a print job in the printing device, printing one or more colors on a transparency medium in accordance with a print job including one or more color filters selected by the computer code to be printed on a front side of the transparency medium for rendering by the printing device as part of the print job, and selecting overhead transparencies to print and inline finish within pages of the print job.

In accordance with features of the embodiment, a method can include steps of providing a printing device modified by computer code to operate in duplex printing mode and engage in inline color transparency finishing; defining at least one of a correction matrix or affine transform in a processor associated with the printing device to account for front to back registration within a transparency medium rendering as part of a print job in the printing device, printing one or more colors on a transparency medium in accordance with a print job including one or more color filters selected by the computer code to be printed on a front side of the transparency medium for rendering by the printing device as part of the print job, selecting overhead transparencies to print and inline finish within pages of the print job, and printing one or more additional color filters on the backside of the transparency medium directly underneath the color filters printed on the front side.

In accordance with features of the embodiment, a method can include steps of providing a printing device modified by computer code to operate in duplex printing mode and engage in inline color transparency finishing; defining at least one of a correction matrix or affine transform in a processor associated with the printing device to account for front to back registration within a transparency medium rendering as part of a print job in the printing device, printing one or more colors on a transparency medium in accordance with a print job including one or more color filters selected by the computer code to be printed on a front side of the transparency medium for rendering by the printing device as part of the print job, selecting overhead transparencies to print and inline finish within pages of the print job, printing one or more additional color filters on the backside of the transparency medium directly underneath the color filters printed on the front side, and inserting the transparency medium including color filters into pages of the print job.

In accordance with features of the embodiment, a method can include steps of providing a printing device modified by computer code to operate in duplex printing mode and engage in inline color transparency finishing; defining at least one of a correction matrix or affine transform in a processor associated with the printing device to account for front to back registration within a transparency medium rendering as part of a print job in the printing device, printing one or more colors on a transparency medium in accordance with a print job including one or more color filters selected by the computer code to be printed on a front side of the transparency medium for rendering by the printing device as part of the print job, selecting overhead transparencies to print and inline finish within pages of the print job, printing one or more additional color filters on the backside of the transparency medium directly underneath the color filters printed on the front side, and inserting the transparency medium including color filters into pages of the print job in the form of a bound book.

In accordance with features of the embodiment, a system can be provided that include a computer associated with a printing device and including computer code to configure the printing device to inline print transparency medium within pages of a print job, the computer code including instructions for the printing device for executing the steps of modifying operation to duplex printing mode, defining at least one of a correction matrix or affine transform in a processor associated with the printing device to account for front to back registration within a transparency medium rendering as part of a print job in the printing device, printing one or more colors on a transparency medium in accordance with a print job including one or more color filters selected by the computer code to be printed on a front side of the transparency medium for rendering by the printing device as part of the print job, and selecting overhead transparencies to print and inline finish within pages of the print job.

In accordance with features of the embodiment, a system can be provided that include a computer associated with a printing device and including computer code to configure the printing device to inline print transparency medium within pages of a print job, the computer code including instructions for the printing device for executing the steps of modifying operation to duplex printing mode, defining at least one of a correction matrix or affine transform in a processor associated with the printing device to account for front to back registration within a transparency medium rendering as part of a print job in the printing device, printing one or more colors on a transparency medium in accordance with a print job including one or more color filters selected by the computer code to be printed on a front side of the transparency medium for rendering by the printing device as part of the print job, selecting overhead transparencies to print and inline finish within pages of the print job, and printing one or more additional color filters on the backside of the transparency medium directly underneath the color filters printed on the front side, and inserting the transparency medium including color filters into pages of the print job, which can be provided in the form of a bound book.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware or any combination thereof (other than software per se). The following detailed description is therefore not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation".

Unless defined otherwise, all technical and scientific terms used herein have the same meanings as commonly understood by one of ordinary skill in the art. As used in this document, the term "comprising" means "including, but not limited to."

Figure 4:
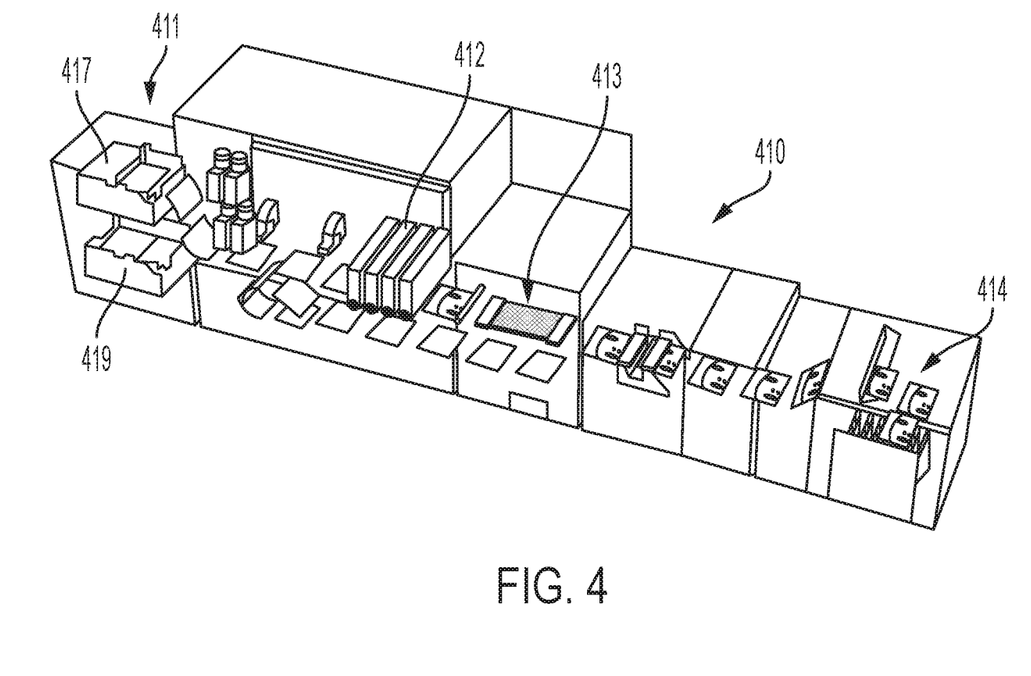
FIG. 4 illustrates a pictorial diagram depicting an example printing system in which an embodiment may be implemented.

The term "printing system" as utilized herein can relate to a printer, including digital printing devices and systems that accept text and graphic output from a computing device, electronic device or data processing system and transfers the information to a substrate such as paper, usually to standard size sheets of paper. A printing system may vary in size, speed, sophistication, and cost. In general, more expensive printers are used for higher-resolution printing. A printing system can render images on print media, such as paper or other substrates, and can be a copier, laser printer, book-making machine, facsimile, or a multifunction machine (which can include one or more functions such as scanning, printing, archiving, emailing, faxing and so on). An example of a printing system that can be adapted for use with one or more embodiments is shown in FIG. 4.

A "computing device" or "electronic device" or "data processing system" refers to a device or system that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like. Various elements of an example of a computing device or processor are described below in reference to FIGS. 1-3.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 1:
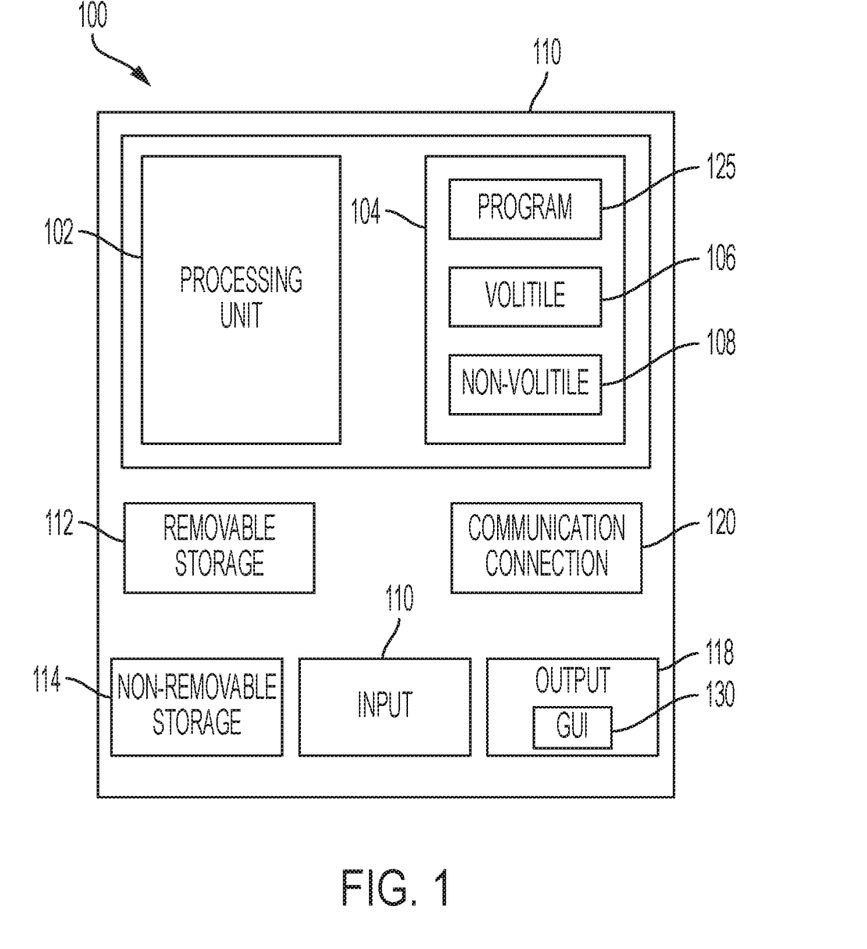
FIG. 1 depicts a block diagram of a computer system, which is implemented in accordance with the disclosed embodiments.
Figure 2:
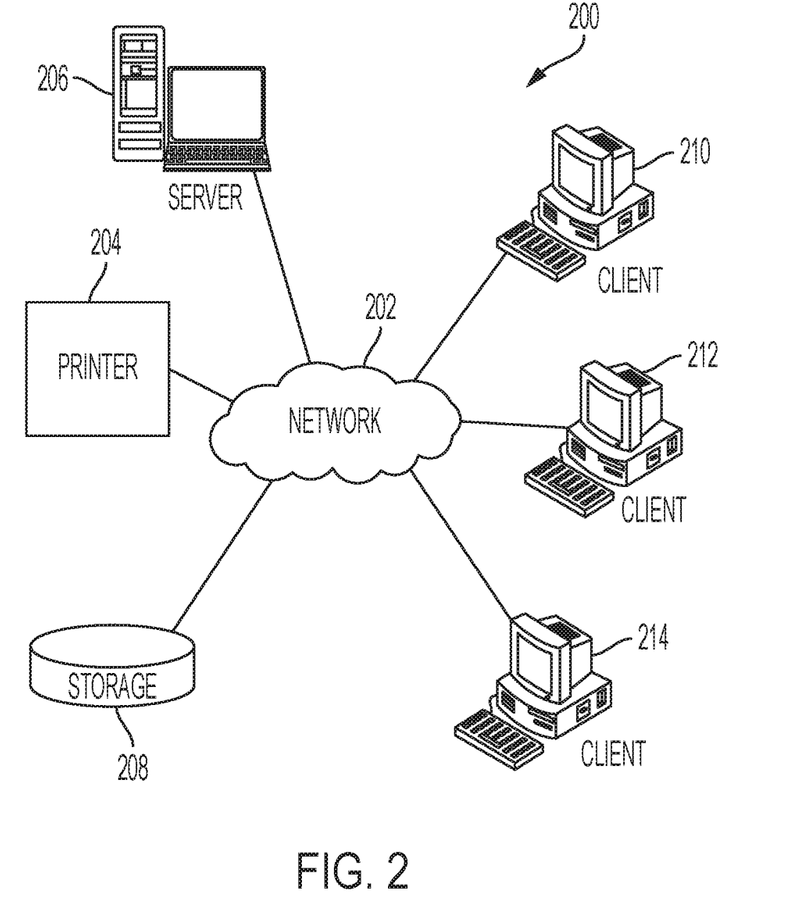
FIG. 2 depicts a graphical representation of a network of data-processing devices in which aspects of the present embodiments may be implemented.
Figure 3:
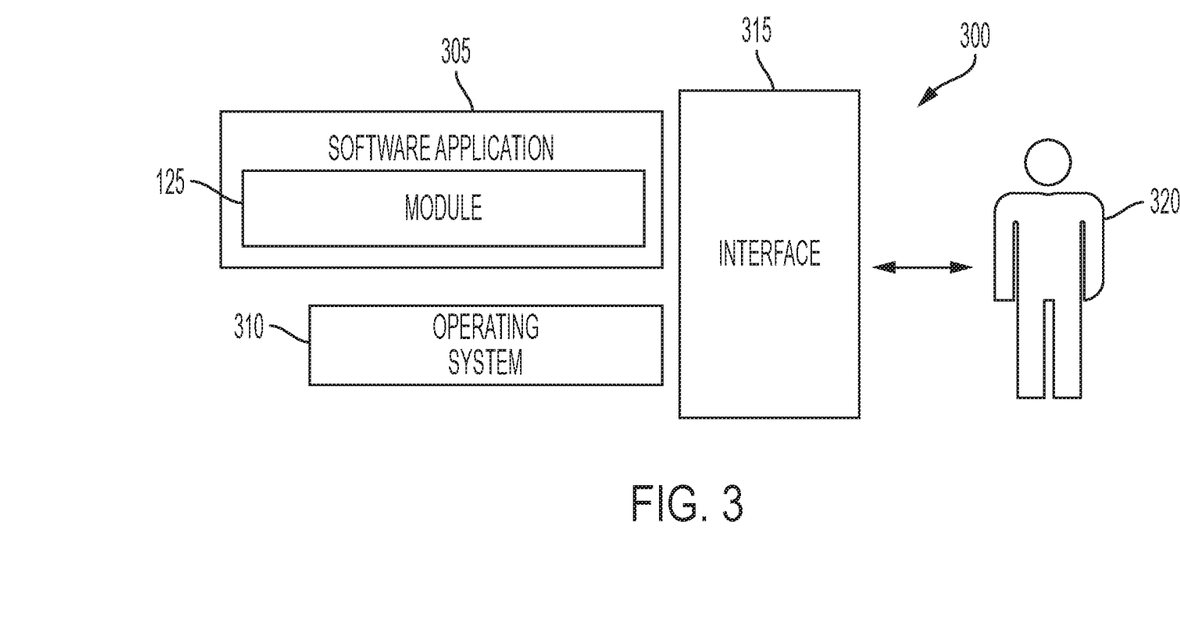
FIG. 3 illustrates a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with controllers, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage as described herein can include, for example, disc storage, disk storage, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Discs (DVD) or other optical disc storage, magnetic cassettes, magnetic tape, magnetic disk storage, or other magnetic storage devices, or any other medium capable of storing computer-readable instructions as well as data including image data.

Computer 110 may include, or have access to, a computing environment that includes input 116, output 118, and a communication connection 120. The computer may operate in a networked environment using a communication connection 120 to connect to one or more remote computers, remote sensors and/or controllers, detection devices, handheld devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection 120 may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device, such as input 116 which can be embodied, for example, as a pointing device such as a mouse, and/or with a keyboard. A particular item can function in the same manner to the user in all applications because the GUI 130 can provide standard software routines (e.g., module 125) to handle these elements and report the user's actions. The GUI 130 can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 can be a network of computers or other such devices, such as mobile phones, smart phones, sensors, controllers, speakers, tactile devices, and the like, in which embodiments of the present invention may be implemented. Note that the system data-processing system 200 can be implemented in the context of a software module, such as module 125. The data-processing system 200 includes a network 202 in communication with one or more clients 210, 212, and 214. Network 202 may also be in communication with one or more printing devices 204, servers 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 206, and one or more external devices such as multifunction device or printer 204, and storage 208, such as a memory storage unit, for example, a memory or database. It should be understood that printing device 204 may be embodied as a printer, copier, fax machine, scanner, multifunction device, rendering machine, photo-copying machine, or other such rendering device.

In the depicted example, printer 204, server 206, and clients 210, 212, and 214 connect to network 202 along with storage 208. Clients 210, 212, and 214 may be, for example, personal computers or network computers, handheld devices, mobile devices, tablet devices, smart phones, personal digital assistants, printing devices, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and printing device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet, with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the computer system 100. The computer system 100 can receive user commands and data through interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the term "module" or "node" as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The module 125 may include instructions (e.g., steps or operations) for performing operations such as those that will be further discussed herein. For example, module 125 can provide instructions for methods described herein. Module 125 can also include instructions for implementing a method of inline color filter implementation on rendered documents, in accordance with features of the embodiments.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" type system, such as Microsoft Windows®. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, rendering devices, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation.

FIG. 4 illustrates a pictorial diagram depicting an example printing system 410 in which an embodiment may be implemented. The printing system 410 shown in FIG. 4 can include a number of sections or modules, such as, for example, a sheet feed module 411, a print head and ink assembly module 412, a dryer module 413 and a production stacker 414. Such modules can be composed of physical hardware components, but in some cases may include the use of software or may be subject to software instructions.

It should be appreciated that the printing system 410 depicted in FIG. 4 represents one example of an aqueous inkjet printer that can be adapted for use with one or more embodiments. Printing system are not limited in size and can include multi-function devices (MFDs) with duplex printing capabilities scaled down for personal use. The particular configuration and features shown in FIG. 4 should not be considered limiting features of the disclosed embodiments. That is, other types of printers can be implemented in accordance with different embodiments. For example, the printing system 410 depicted in FIG. 4 can be configured as a printer that uses water-based inks or solvent-based inks, or in some cases may utilize toner ink in the context of a LaserJet printing embodiment.

The sheet feed module 411 of the printing system 410 can be configured to hold, for example, 2,500 sheets of 90 gsm, 4.0 caliper stock in each of two trays. With 5,000 sheets per unit and up to 4 possible feeders in such a configuration, 20,000 sheets of non-stop production activity can be facilitated by the printing system 410. The sheet feed module can include an upper tray 17 that holds, for example, paper sizes 8.27"×10"/210 mm×254 mm to 14.33"×20.5"/364 mm×521 mm, while a lower tray 19 can hold paper sizes ranging from, for example, 7"×10"/178 mm×254 mm to 14.33"× 20.5"/364 mm×521 mm. Each feeder can utilize a shuttle vacuum feed head to pick a sheet off the top of the stack and deliver it to a transport mechanism.

The print head and ink assembly module 412 of the printing system 410 can include, for example a plurality of inkjet print heads that deliver four different drop sizes through, for example, 7,870 nozzles per color to produce prints with, for example, a 600×600 dpi. An integrated full-width scanner can enable automated print head adjustments, missing jet correction and image-on-paper registration. Operators can make image quality improvements for special jobs such as edge enhancement, trapping, and black overprint. At all times automated checks and preventative measures can maintain the press in a ready state and operational.

The dryer module 413 of the printing system 410 can include a dryer. After printing, the sheets can move directly into a dryer where the paper and ink are heated with seven infrared carbon lamps to about 90° C. (194° F.). This process removes moisture from the paper so the sheets are stiff enough to move efficiently through the paper path. The drying process also removes moisture from the ink to prevent it from rubbing off. A combination of sensors, thermostats, thermistors, thermopiles, and blowers accurately heat these fast-moving sheets, and maintain rated print speed.

The production stacker 414 can include a finisher that can run over a period of time as it delivers up to 2,850 sheets at a time. Once unloaded, the stack tray can return to a main stack area to pick and deliver another load. The stacker 414 can provide an adjustable waist-height for unloading from, for example, 8" to 24", and a by-pass path with the ability to rotate sheets to downstream devices. The production stacker 414 can also be configured with, for example, a 250-sheet top tray for sheet purge and samples, and can further include an optional production media cart to ease stack transport. One non-limiting example of printing system 110 is the Xerox® Brenva® HD Production Inkjet Press, a printing product of Xerox Corporation. Such a printing system can include transport members such as the transport belts discussed herein and/or other features including for example a Brenva®/Fervent® marking transport, which is also a product of Xerox Corporation.

Figure 5:
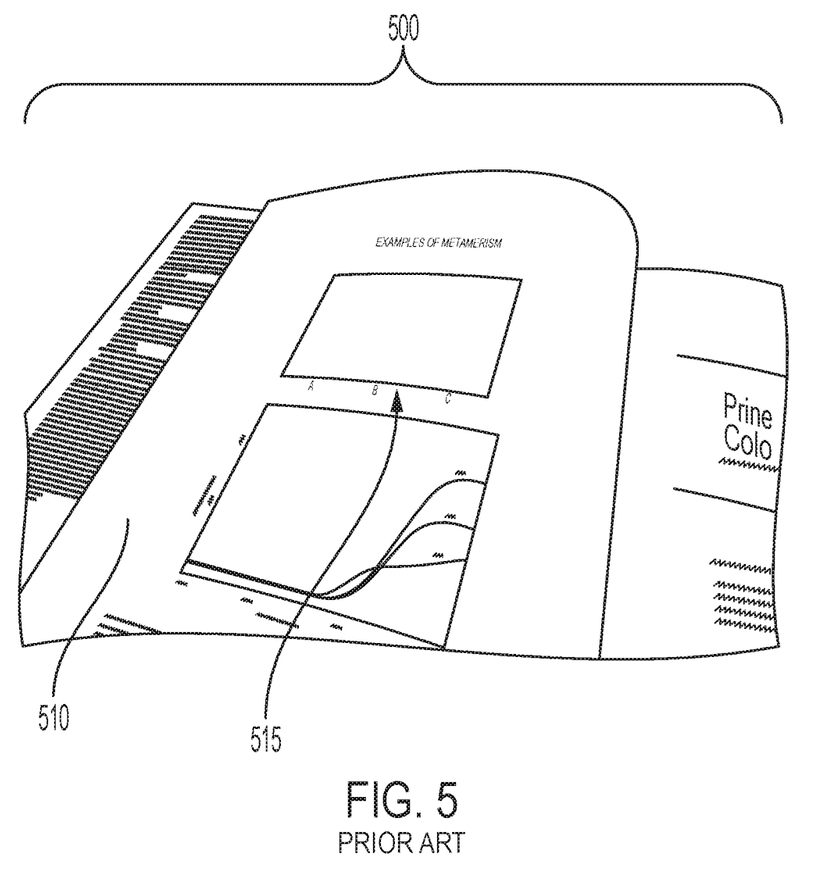
FIG. 5 (labeled Prior Art) illustrates a mixed media book including transparency film material pasted onto a paper page contained therein.

As discussed in the Background, transparent film material has sometimes been utilized in combination with other media, such as standard printing paper as part of a book or other bound work, such as the example shown in the photograph depicted in FIG. 5, labeled as Prior Art. The problem with mass production of combined media where colored transparencies will be used is that the transparent film must be separately printed and then incorporated into the bound work with pages of printed paper. Sometimes, it is desired that only a portion of a printed page bare the transparent film, in which case a portion of transparency film will be pasted onto a page of the bound work (e.g., a book), as shown in the photograph depicted in FIG. 5.

The methods disclosed herein describe printing a desired filter color within a fixed area on a transparency sheet (e.g. similar to the kind used for overhead projectors in the past) and inserting the printed transparency sheet within a normal print job. This can provide a low quality color filter that can be incorporated into a book. The color filter can be used for either instructional purposes or simple effects (e.g., viewing color blind targets). The transparency can be printed in duplex mode to increase the color filtering amount of the filter. Benefits of the invention include a person's ability to include color filters in printed output without additional finishing or special page inclusion/insertion.

Figure 6:
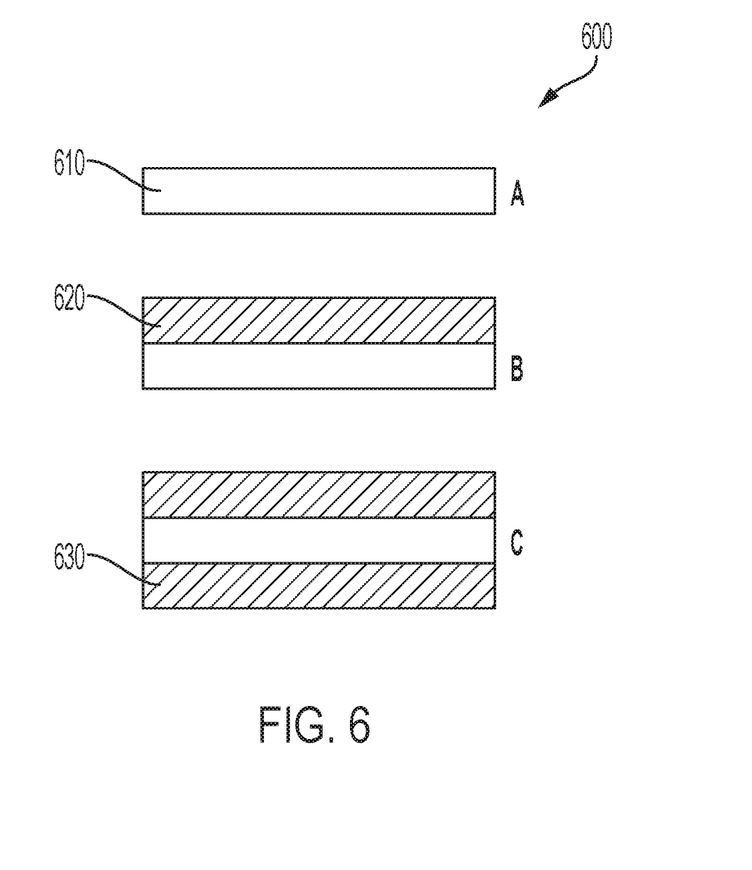
FIG. 6A-6C illustrate side views of transparency media material with color printed on a first side and then a second side to create a filter for inline rendering in association with a print job.

FIGS. 6A-6C illustrates a side view 600 of an overhead transparency 610, with an example magenta filter 620 printed on the front side, and which can function, for example, as a filter that absorbs about 80-90% of green light and may not be of sufficient quality for a high end application, e.g., photography, but can work well enough for a lower end application, e.g., such as a science experiment. An additional step of printing another magenta filter 630 directly underneath the front side filter 620 (but on the backside of the transparency medium/page) can create a more efficient filter. For example if the filter 620 absorbs 90% of green light, then the filter 630 can absorbs 90% of the remaining green light for a net absorption of 99%.

Figure 7:
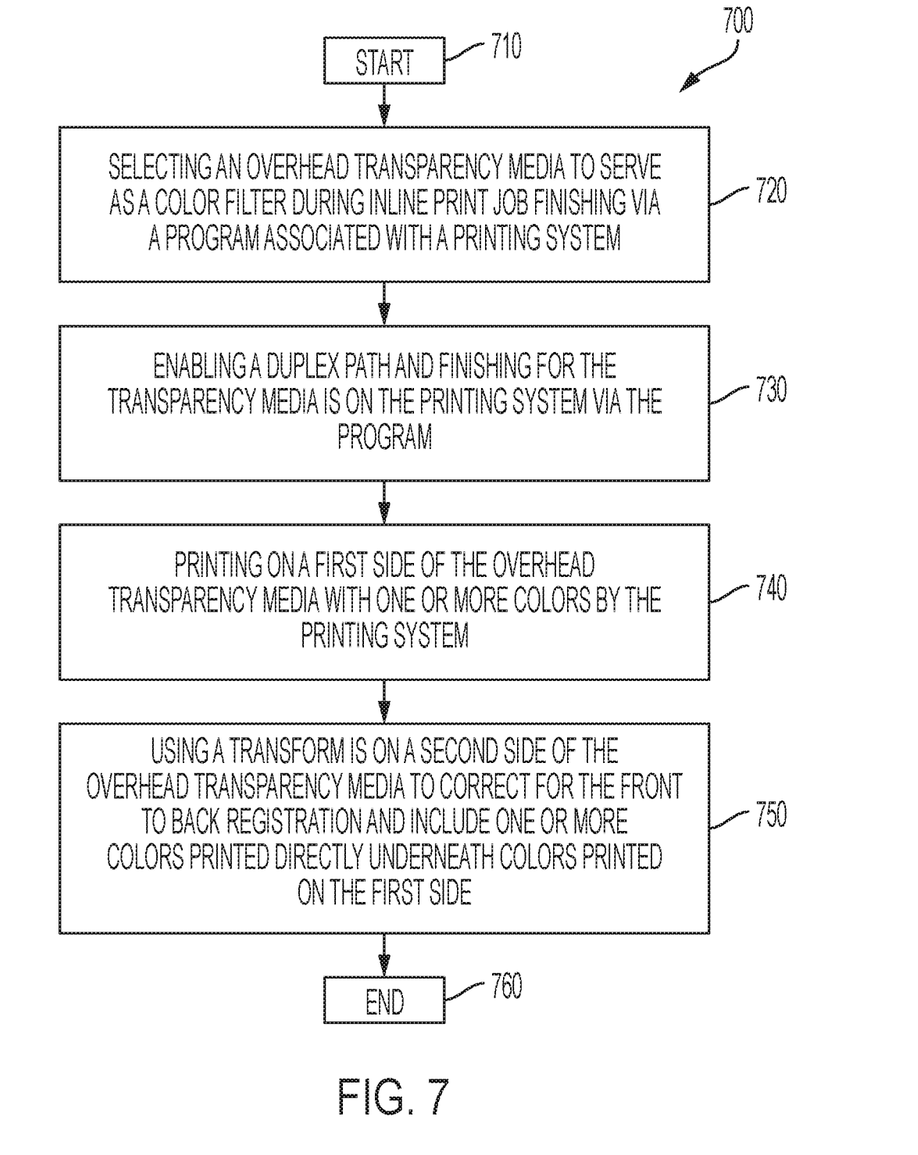
FIG. 7 illustrates a flow diagram of a method for inline rendering of a color filter within a print job, in accordance with an embodiment.

Referring to FIG. 7, a flow diagram of a method 700 for inline rendering of a color filter within a print job in accordance with features of the embodiments is illustrated. The method 700 can begin as shown in Block 710. As depicted next in Block 720, an overhead transparency media can be selected by programming associated with a printing system to serve as a color filter for inline print job finishing. The duplex path and finishing function for the overhead transparency media can be enabled on a printing system by the programming as shown in Block 730. A first side of the overhead transparency media is printed on with one or more colors (e.g. magenta) by the printing system as shown in Block 740. As shown in Block 750, a transform is used on a second side of the overhead transparency media to correct for front to back registration and can be printed on with one or more colors directly underneath colors printed on the first side. The method can then end as shown in Block 760. Note that if the same color is used on both sides the filters can act in series to enhance the quality of the overall filter.

Figure 8:
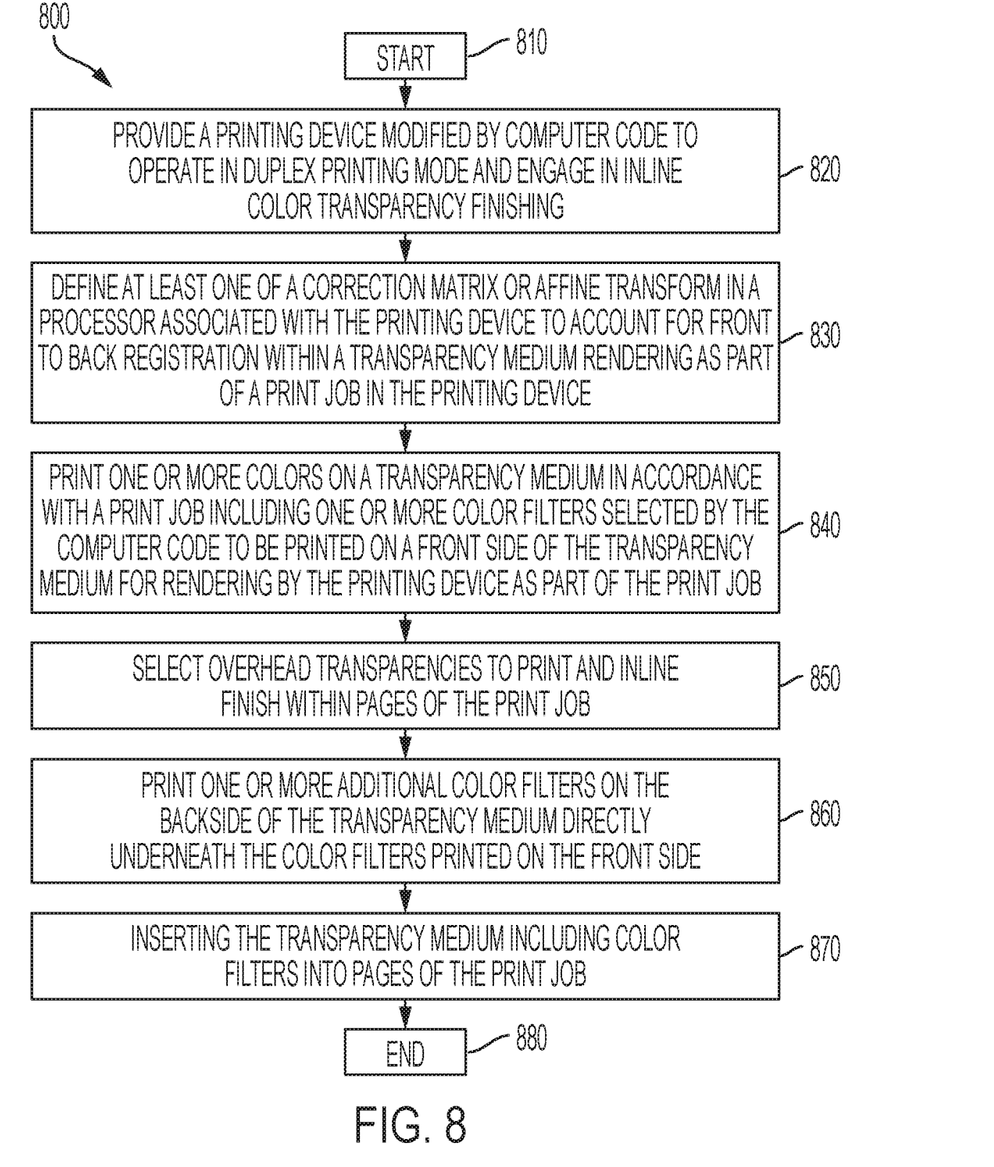
FIG. 8 illustrates a flow diagram of another method for inline rendering of a color filter within a print job, in accordance with an embodiment.

Referring to FIG. 8, a flow diagram of a method 800 is illustrated in accordance with the embodiments. The method 800 can begin as shown in Block 810. As shown in Block 820, a printing device can be modified by computer code to operate in duplex printing mode and engage in inline color transparency finishing. As shown in Block 820, a correction matrix or affine transform is defined in a processor associated with the printing device to account for front to back registration within a transparency medium rendering as part of a print job in the printing device. Then as shown in Block 830, a job that includes a transparency medium with one or more color filters to be printed on the front side is selected for rendering by the printing device as part of the print job. As shown in Block 850, overhead transparencies are selected to print and inline finish within pages of the job. As shown in Block 860, one or more additional color filters can be printed on the backside of the transparency medium directly underneath the color filters printed on the front side. Then, as shown in Block 870, color filters can be inserted into pages of the print job. The method can then end as shown in Block 880. It should be noted that the print job could be provided in the form of a bound book.

It should be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for inline rendering of a color filter within a print job, comprising:
    a program associated with a printing system is run for enabling selection of an overhead transparency media to serve as a color filter during inline print job finishing;
    a duplex path and finishing for the overhead transparency media is enabled on the printing system by the program;
    a first side of the overhead transparency media is printed on with one or more colors by the printing system by the program; and
    a transform is used on a second side of the overhead transparency media to correct front to back registration and includes one or more colors printed directly underneath color printed on the first side of the overhead transparency media by the program.

2. The method of claim 1, wherein if a same color is used on both sides of the overhead transparency media, then the same color acts in series to enhance the quality of the overhead transparency media as a filter.

3. The method of claim 1, further comprising:
    inserting the overhead transparency medium including color printed thereon into pages of the print job.

4. The method of claim 1, further comprising:
    inserting the overhead transparency medium including color printed thereon into pages of the print job in the form of a bound book.

5. The method of claim 1, wherein if a more than one color is used on both sides of the overhead transparency media, then the more than one color acts in series to enhance the quality of the overhead transparency media as a filter.

6. The method of claim 5, further comprising:
    inserting the overhead transparency medium including color printed thereon into pages of the print job.

7. The method of claim 5, further comprising:
    inserting the overhead transparency medium including color printed thereon into pages of the print job in the form of a bound book.

8. A method for inline rendering of a color filter within a print job, comprising:
- providing a printing device modified by computer code to operate in duplex printing mode while engaging in inline transparency medium finishing;
- defining a correction matrix in a processor associated with the printing device to account for front to back registration upon a transparency medium rendering as part of a print job in the printing device; and
- printing one or more colors on the transparency medium in accordance with a print job including one or more color filters selected by the computer code to be printed on a front side of the transparency medium selected for rendering by the printing device as part of the print job and based on the correction matrix.

9. The method of claim 8, further comprising:
- printing one or more additional color filters on the backside of the transparency medium directly underneath the color filters printed on the front side.

10. The method of claim 8, further comprising:
- inserting the transparency medium including color filters printed thereon into pages of the print job.

11. The method of claim 8, further comprising:
- inserting the transparency medium including color filters printed thereon into pages of the print job in the form of a bound book.

12. The method of claim 9, further comprising:
- inserting the transparency medium including color filters printed thereon into pages of the print job.

13. The method of claim 9, further comprising:
- inserting the transparency medium including color filters printed thereon into pages of the print job in the form of a bound book.

14. A system for inline rendering of a color filter within a print job, comprising:
- a computer associated with a printing device and including computer code to configure the printing device to inline print a transparency medium within pages of a print job, the computer code including instructions for the printing device to execute the steps of:
  - modifying transparency medium printing operation to duplex printing mode;
  - defining at least one of a correction matrix or affine transform in a processor associated with the printing device to account for front to back registration within the transparency medium rendering as part of a print job in the printing device;
  - printing one or more colors on the transparency medium in accordance with a print job including one or more color filters selected by the computer code to be printed on a front side of the transparency medium for rendering by the printing device as part of the print job; and
  - selecting at least one overhead transparency to print and inline finish within pages of the print job.

15. The system of claim 14, further comprising the computer configured by the computer code to print one or more additional color filters on the backside of the transparency medium directly underneath the color filters printed on the front side.

16. The system of claim 14, further comprising the computer configured by the computer code to insert the transparency medium including color filters into pages of the print job.

17. The system of claim 14, further comprising the computer configured by the computer code to inserting the transparency medium including color filters into pages of the print job in the form of a bound book.

18. The system of claim 15, further comprising the computer configured by the computer code to insert the transparency medium including color filters into pages of the print job.

19. The system of claim 15, further comprising the computer configured by the computer code to inserting the transparency medium including color filters into pages of the print job in the form of a bound book.

20. The method of claim 14, further comprising:
- printing one or more additional color filters on a backside of the transparency medium directly underneath the one or more color filters printed on the front side.

* * * * *